United States Patent [19]

Peters et al.

[11] 4,335,330
[45] Jun. 15, 1982

[54] LOW-PRESSURE MERCURY VAPOR DISCHARGE LAMP

[75] Inventors: Robert C. Peters; Louis E. Vrenken; Winston D. Couvbenberg; Franciscus A. S. Ligthart, all of Eindhoven, Netherlands

[73] Assignee: U.S. Philips Corporation, New York, N.Y.

[21] Appl. No.: 120,602

[22] Filed: Feb. 12, 1980

Related U.S. Application Data

[63] Continuation of Ser. No. 38,616, May 14, 1979, abandoned, which is a continuation of Ser. No. 845,926, Oct. 27, 1977, abandoned.

[30] Foreign Application Priority Data

Nov. 2, 1976 [NL] Netherlands .......................... 7612157
Nov. 2, 1976 [NL] Netherlands .......................... 7612158
Aug. 23, 1977 [NL] Netherlands .......................... 7709263

[51] Int. Cl.$^3$ ............................................. H01J 61/44
[52] U.S. Cl. ..................................... 313/486; 313/493
[58] Field of Search ................ 313/493, 485, 486, 220

[56] References Cited

U.S. PATENT DOCUMENTS 2,425,697  8/1947  Hultgren .......................... 313/485 X
3,778,662 12/1973  Johnson ........................... 313/185 X
3,780,329 12/1973  Otsuka et al. .................... 313/485 X
3,780,330 12/1973  Otsuka et al. .................... 313/485 X

FOREIGN PATENT DOCUMENTS 2109898 11/1974 Fed. Rep. of Germany .

OTHER PUBLICATIONS

"Short-Term Initial Lumen Depreciation in Fluorescent Lamps," by Vrenken et al., *Illuminating Engineering*, Jan. 1964, pp. 59–66.

Primary Examiner—Palmer C. Demeo
Attorney, Agent, or Firm—Robert S. Smith

[57] ABSTRACT

Low-pressure mercury vapor discharge lamps provided with a luminescent layer and having a relatively high power consumption. Lamps are loaded by at least 500 W per m$^2$ surface area of the luminescent layer. In some embodiments the lamps have a nominal length of 60 to 150 cm and consume a nominal power of 0.25 to 0.50 W per cm length of the discharge tube.

7 Claims, 3 Drawing Figures

LOW-PRESSURE MERCURY VAPOR DISCHARGE LAMP

This is a continuation of application Ser. No. 038,616, filed May 14, 1979, which was a continuation of application Ser. No. 845,926 filed Oct. 27, 1977. Both of the earlier applications are now abandoned.

The invention relates to a low-pressure mercury vapour discharge lamp having a vacuum-tight radiation-transmissive envelope provided with a luminescent layer and a gas filling containing mercury and a rare gas, and furthermore provided with means for maintaining a column discharge in the gas filling, the power consumed by the column resulting in a relatively high wall load of the lamp envelope.

In one aspect the invention relates to such lamps wherein the power consumed by the column is at least 500 W per $m^2$ surface area of the luminescent layer.

In another aspect the invention relates to such lamps having a nominal length of 60 to 150 cm, an inside diameter of from 20 to 28 mm, and intended to consume during operation a nominal power of 0.25 to 0.50 W per cm length of the discharge tube.

Low-pressure mercury vapour discharge lamps are radiation sources which are used on a very large scale both for general illumination and for special purposes (photochemistry etc.), because they convert the applied electric power very efficiently into radiation. In general these lamps consist of a tubular envelope which may be straight or curved, for example bent to form a circle or U-shape. This envelope contains a gas mixture of mercury and one or more rare gasses in which a discharge column is produced. Means are present for maintaining this column discharge by supplying electric energy to the gas mixture. The means usually comprise two electrodes. Mainly ultra-violet radiation is produced in the discharge, a comparatively small part of which has wave lengths of approximately 185 nm, the greatest part having wave lengths of approximately 254 nm. This ultra-violet radiation is converted by means of a luminescent layer applied to the interior surface of the lamp envelope, into radiation having waves of a longer length and a spectral distribution, depending on the luminescent material used, in the near ultra-violet or in the visible part of the spectrum.

One of the most prevalent lamp types is the so-called 40 W/T12-lamp consisting of a straight tube which has a length of approximately 1.20 m and a diameter of approximately 37 mm, and consuming a power of approximately 40 W. In general this lamp is operated with a lamp current of approximately 400 mA and an electric field strength in the column of approximately 80 V/m. The temperature of the coldest spot of the envelope of a lamp which is free-burning in air assumes, in these circumstances, a value of approximately 40° C. at which a mercury vapour pressure of approximately $6.10^{-3}$ torr occurs. It appeared that these circumstances are substantially optimum as regards the production of ultra-violet radiation. Other frequently occurring lamp types have in operation lamp current, electric field and mercury vapour pressure values which correspond to the above-mentioned values or do not deviate much therefrom. The wall load of these lamps, that is to say the power input of the column per surface unit of the luminescent layer, has a value of approximately 300 $W/m^2$ in these lamps.

Low-pressure mercury vapour discharge lamps have already been made, wherein a considerably higher wall load, namely over 500 $W/m^2$ is applied. This was done in the first place with the object of obtaining small and compact lamps. German Offenlegungsschrift 2.109.898, for example, discloses small lamps having wall loads up to approximately 2500 $W/m^2$. The electric field strength in these lamps is higher than in the normal lamps and has, for example, a value of the order of 600 V/m. Wall loads of the order of 25,000 $W/m^2$ may occur in these lamps.

A major drawback of the prior art lamps with a relatively high wall load is that the efficiency of the lamp, that is to say the relative radiant flux or luminous flux of the useful radiation emitted by the luminescent layer (the output of useful radiation per unit of electric power applied to the lamp) appears to have a low value. In particular this efficiency is considerably lower than that of the normal lamp (for example the 40 W/T12-lamp). This drawback is especially felt with the compact lamps and is one of the causes that this lamp type, which might offer great advantages for practical applications, for example as a substitute for the normal incandescent lamps, has as yet not been introduced. The reason why it appeared to be impossible to produce lamps having a greater power input per volume unit and with an efficiency comparable to that of the normal lamps was not understood. Also known insights as regards the optimum mercury vapour pressure (which appears to be higher for lamps which are loaded to a greater extent, for example to 0.75 torr at a temperature of the coldest spot of the lamp of 120° C.) and means for controlling the mercury vapour pressure (amalgams etc.) did not lead to the desired result. It has, therefore, been the general opinion so far that producing a compact lamp, for example by reducing the diameter while maintaining the electric power supplied must inevitably be accompanied by loss in efficiency.

The invention has for its object to provide low-pressure mercury vapour discharge lamps with a high density of the consumed power and with a high radiation efficiency, so that compact lamps with an efficiency substantially equal to that of the normal low-pressure mercury vapour discharge lamps become available.

According to a first aspect of the invention a lamp of the type mentioned in the preamble is provided, wherein the power consumed by the column is at least 500 W per $m^2$ surface area of the luminescent layer, and wherein the luminescent layer comprises a luminescent material which has the property of having at 254 nm excitation a luminous flux, which, after the material has been subjected for 15 minutes to ultra-violet radiation of wave lengths of, mainly, 185 and 254 nm and a radiation density between 150 and 500 $W/m^2$ and a ratio of 185 nm-power to 254 nm-power between 0.20 and 0.40, is not more than 5% lower than the initial luminous flux of the material also at 254 nm excitation and measured in identical circumstances, and in that the combination of cations in the luminescent material has an electronegativity of not more than 1.4.

Experiments which resulted in the invention have proved that an efficient conversion of the electric power into ultra-violet radiation is possible in a highly loaded lamp. It was quite surprisingly found that the efficiency of this conversion can be substantially equal to that of the normal 40 W/T12-lamp. It was found to be a prerequisite that the electron temperature in the highly loaded lamp assumes a value which is not smaller, and, preferably, even greater than that in the normal lamp. Various measures are possible to achieve this. Starting, for example, from the normal lamp, the required high electron temperature is maintained if a smaller diameter of the discharge tube is chosen and the electric power supplied to the lamp is kept substantially constant. Compared to the normal lamps the electric field strength is higher, the lamp current lower and the wall load higher. Experiments proved that said high efficiency of the conversion into ultra-violet radiation can also be obtained with very low values of the diameter of the discharge tube (from one to a few mm).

It was furthermore found that with an efficient production of ultra-violet radiation in highly loaded lamps there is not only a high ultra-violet radiation density at the wall but also the share of the radiation having wavelength of 185 nm is relatively higher than in normal lamps. This unexpectedly high ratio between the 185 nm radiation and the 254 nm radiation combined with the increased density of the total ultra-violet radiation produced results in that in particular the 185 nm-load of the wall of such lamps is considerably higher than in normal lamps.

The invention is based on the recognition that failure of the prior art lamps with high wall load is not due to a low efficiency of the conversion into ultra-violet radiation, as has been generally assumed sofar, but is due to the luminescent materials used. The invention provides suitable luminescent materials as a measure for obtaining efficient, highly loaded lamps. Consequently, the present invention opens the way to an entirely new lamp type, namely the compact low-pressure mercury vapour discharge lamp which can replace the normal incandescent lamp which is used in very great numbers. As the efficiency of the low-pressure mercury vapour discharge lamp is approximately 5 times greater than that of the incandescent lamp a very considerable savings in energy is possible. In a lamp according to the invention a luminescent material is used which is, on the one hand, highly resistant against 185 nm radiation, that is to say it has only a very slight decrease in the luminous flux (on excitation by 254 nm radiation) owing to irradiation by 185 nm rays and which, on the other hand, has a high mercury resistance.

It is known that subjecting a luminescent material to 185 nm radiation has in general already after a very short period of time a detrimental effect on the luminous flux of the luminescent material. As a measure of the resistance to 185 nm radiation the so-called short term decrease is used, which in this description must be understood to mean the decrease (in %) in the luminous flux of the material (on 254 nm excitation), as the resulting from irradiation for fifteen minutes by radiation having wave lengths of mainly 185 nm and 254 nm with a radiation density between 150 and 500 W/m² and with a ratio of 185 nm-power to 254 nm-power between 0.20 and 0.40. An arrangement for determining the short term decrease as well as the value of this decrease for some luminescent materials are known from "Illuminating Engineering" 59 (1964), pages 59–66. Such an arrangement will be described in greater detail herebelow. Owing to the high density of 185 nm radiation, high requirements are imposed in lamps according to the invention on the short term decrease of the luminescent material. This decrease shall not be higher than 5%. It has, namely, been found that for higher value of this decrease lamps are obtained which furnish an unacceptable low luminous flux already after having burned for a very short period of time (actually already after the few minutes which are required for obtaining a steadily burning lamp; in practice the short term decrease has already taken place when the luminous flux of the lamp is measured in order to obtain the so-called luminous flux value at 0 hour.).

In a lamp according to the invention the luminescent material must not only satisfy the requirement as regards the short term decrease but also the requirement for a higher degree of mercury resistance. It has, namely, been found that the luminous layer in highly loaded lamps is exposed to a much greater number of collisions with excited mercury atoms and mercury ions than is the case in normal lamps. The highly energetic mercury atoms and ions can be absorbed at the surface of the luminescent layer and/or react with the luminescent material. Consequently a darkening of the luminescent layer occurs which considerably reduces the luminous flux of the lamp. A measure of the mercury resistance of a luminescent material is found in the electronegativity (e.n.) of the cations of the luminescent material. In this description and the claims cations must be understood to mean the metals from the series 1A, 1B, 2A, 2B and 3B of the periodical system of elements as specified in "Handbook of Chemistry and Physics", published by the Chemical Rubber Co., Cleveland, Ohio (1968). The further elements are here considered as anions or anion-forming elements. The values of the e.n. of the elements are given in L. Pauling "The Nature of the Chemical Bond", Cornell University Press, Ithaca, N.Y. (1945). If the elements are arranged in a series on the basis of an increasing value of the e.n. the so-called electromotive series of the elements is obtained. In principle a certain element can supersede all elements from these series having the same or a higher value for the e.n. It is now clear that mercury (which has an electronegativity of 1.9) will attack luminescent materials whose cation has and e.n. $\geq 1.9$ (these cations are equally as noble or more noble than mercury). It was now found that the cation of a luminescent material suitable for lamps according to the invention must have a relatively low e.n., namely not more than 1.4. This can be explained from the fact that the mercury in the discharge plasma is richer in energy than neutral mercury and from the fact that the number of times the mercury collides with the luminescent layer is high. It was found, for example, that a luminescent material containing zinc (e.n. = 1.6) as a cation, which in normal lamps shows some mercury attack only after a relatively long operating period, can definitely not be used in highly loaded lamps because the luminescent layer is already markedly darkened after the lamp has burnt for some minutes to some hours. If a luminescent material contains several cations, for example, if the element used as an activator is a cation, the combination of cations should have an e.n. of not more than 1.4, that is to say the weighted average of the electronegativities of the cations shall not be more than 1.4. In that case it is possible that a small part of the cations in the luminescent material has for itself an e.n. higher than 1.4.

Preference is given to low-pressure mercury vapour discharge lamps according to the invention containing a luminescent material which has the property that it furnishes, after the above-described ultra-violet irradiation for 15 minutes, a luminous flux which is not more than 3% smaller than the initial luminous flux. Luminescent materials which have such a low short term decrease result in lamps having luminous efficacies at least as high as in normal lamps, even with very high wall loads.

In lamps according to the invention an electric field strength of 150 to 1000 V/m is preferably maintained in the column discharge during operation. This relatively high field strength can be obtained by choosing a relatively small diameter of the lamp envelope. With a relatively low lamp current compact, highly loaded lamps having a high luminous efficacy are obtained then.

A very advantageous embodiment of such a lamp, operated with a field strength of 150 to 1000 V/m has a tubular envelope whose cross-section perpendicular to the axis of the tube is substantially circular and whose inside diameter has a value from 3 to 15 mm. It was found that in said diameter range very efficient lamps having a luminous efficacy substantially equal to that of the normal lamps (having an inside diameter of approximately 36 mm) are obtained.

Ln represents at least one of the elements Y, Gd and Lu and where $0.01 \leq p \leq 0.20$. These luminescent oxides, which are known per se appear to have a very small short term decrease and are highly resistant to mercury, so that they can be used with great advantage in lamps according to the invention.

A further preferred embodiment of a lamp according to the invention contains a luminescent aluminate, activated by Ce or by Tb and Ce and having a hexagonal crystal structure related to the structure of magnetoplumbite which aluminate satisfies the formula $(Ce_{1-p-q}La_pTb_q)_2O_3 \cdot xMgO \cdot yAl_2O_3$, wherein up to 25 mol.% of the $Al_2O_3$ may have been replaced by $Ga_2O_3$ and/or $Sc_2O_3$ and where $0 \leq x \leq 2$
$0 \leq y \leq 16$
$0 \leq p \leq 0.50$
$0 \leq q \leq 0.60$
$p + q \leq 0.90$ This group of luminescent materials is known per se from Dutch Patent Applications 7214862 and 7216765, (U.S. patent application Ser. No. 699,344 filed June 24, 1976, which is a continuation of abandoned Ser. No. 410,184 filed Oct. 26, 1973 is the counter part of the former application. U.S. patent application Ser. No. 419,436 filed Nov. 27, 1973 is the counter part of the latter), to which reference is made for further particulars regarding composition and luminescent properties. The contents of these applications is incorporated by reference herein. It has been found that these aluminates have a small short term decrease and a good mercury resistance.

A further preferred embodiment of a lamp according to the invention contains a luminescent aluminate activated by bivalent europium, by bivalent europium and bivalent manganese or by trivalent corium and having a hexagonal crystal structure related to the structure of β-alumina, which aluminate satisfies the formula $MeO \cdot xMgO \cdot yAl_2O_3$; $pEuO \cdot qMnO \cdot rCe_2O_3$, wherein Me represents barium and/or strontium, wherein up to 25 mol.% of $Al_2O_3$ may have been replaced by $Ga_2O_3$ and/or $Sc_2O_3$ and where $0 \leq x \leq 2$
$5 \leq y \leq 8$
$0.01 \leq p \leq 0.50$
$0 \leq q \leq 1.0$
$0 \leq r \leq 0.50$, Me being barium if $x=0$. This group of luminescent materials is known per se from Dutch Patent Applications 6715823, 7214862 and 7214860, to which reference is made for further particulars as regards composition and luminescent properties. The contents of these applications is incorporated herein by reference. Also these luminescent aluminates are particularly suitable for use in lamps according to the invention owing to their very low short term decrease and good mercury resistance.

Furthermore preference is given to a lamp according to the invention the luminescent layer of which contains at least a luminescent material from the group consisting of bivalent europium-activated strontium tetraborate, lead-activated barium disilicate, bivalent europium-activated strontium chlorophosphate with apatite structure, gadolinium metaborate activated by cerium and terbium, and gadolinium borate activated by trivalent bismuth and trivalent europium. Also these materials have, as will be shown hereinafter, an excellent short term decrease. Because their mercury resistance is also very favourable, they can be advantageously used in lamps according to the invention.

According to a second aspect of the invention a lamp of the type mentioned in the preamble of this specification is provided having a nominal length of from 60 to 150 cm, an inside diameter of from 20 to 28 mm, which lamp is intended to consume during operation a nominal power of 0.25–0.50 W per cm length of the discharge tube, wherein the luminescent layer comprises at least one luminescent material of the group consisting of luminescent aluminates having a hexagonal crystal structure related to the structure of hexagaonal ferrites and red-luminescing trivalent europium activated rare earth metal oxides having a composition defined by the formula $Ln_2O_3$;pEu, wherein Ln represents at least one of the metals Y, Gd and Lu and wherein $0.01 \leq p \leq 0.20$.

U.S. Pat. No. 3,780,329 discloses a 40 W lamp with an inside diameter of 20-25 mm. This lamp which is provided with a luminescent calcium halophosphate, activated by antimony and manganese furnishes an approximately 5% higher luminous flux compared with a lamp having an inside diameter of 36 mm which is otherwise the same. It was found that reducing the tube diameter results in an increased ultraviolet production in the 185 nm mercury line, while the intensity of the 254 nm mercury line does not increase substantially. As the luminescent halophosphates have at 185 nm excitation a substantially equally great quantum efficiency as with 254 nm excitation, the increased ultraviolet production may result in these lamps in a higher luminous flux. However, so far such a diameter of 20 to 25 mm has in practice not been used in this type of lamp because the relatively low gain in luminous flux appears to be lost comparatively quickly during the life of the lamp.

Low-pressure mercury vapour lamps having a nominal power of 0.3 Watts per cm of the discharge tube length provided with a luminescent aluminate with hexagonal crystal structure related to the structure of the hexagonal ferrites are known from United Kingdom Specifications 1,190,520, 1,384,683, 1,393,040 and 1,452,083 and from United Kingdom Application 49208/76. These aluminates form a large group of very efficiently luminescing materials with emission, depending on the element which was chosen as activator, in the visible or near ultraviolet portion of the spectrum. They can be used in lamps for general illumination (as described in United Kingdom Specification 1,458,700), or in lamps for special applications such as photo-chemistry or document reproduction. The most important activators are the elements cerium, terbium, europium and manganese. These aluminates have crystal structures which are related to the crystal structure of the hexagonal ferrites. They can be divided into three groups: compounds with magnetoplumbite structure, for example $(Sr, Ca) Al_{12}O_{19}$, compounds with disturbed magnetoplumbite structure such as $LaAl_{11\text{-}2/3}O_{19}$ and $LaMgAl_{11}O_{19}$, and compounds with $\beta$-alumina-structure such as $BaAl_{12}O_{19}$ and $(Ba, Sr)MgAl_{10}O_{17}$.

United Kingdom Patent Specification 1,458,700 describes low-pressure mercury vapour discharge lamps which contain a red-luminescing, trivalent europium-activated rare earth metal oxide, and these lamps emit in comparatively narrow spectral ranges, situated in the blue, in the green and in the red portion of the spectrum. With these lamps it is possible to obtain both a high luminous flux and a proper rendition of object colours. The red emission in these known lamps is obtained from a rare earth metal oxide activated by $Eu^{3+}$. The contents of United Kingdom Patent Specification 1,458,700 is incorporated by reference herein.

It was surprisingly found that with lamps according to said second aspect of the invention a luminous flux can be obtained which is 10% higher than the luminous flux of a comparable lamp having a discharge tube with an inside diameter of 36 mm, which has been generally accepted hitherto as being the optimum with regard to lamp performance. This was not to be expected because the increase in the intensity of the ultraviolet radiation produced in the discharge when changing from a diameter of 36 mm to a diameter of 20-28 mm is entirely at the 185 nm line and because the quantum efficiency of the luminescent hexagonal aluminates at 185 nm-excitation is considerably lower than that at 254 nm-excitation. For the latter see Journal of the Electro-chemical Soc. Vol. 123, No. 8, 1976, page 1253. From this article the quantum efficiency at 185 nm-excitation, $q_{185}$, for, for example, $CeMgAl_{11}O_{19}\text{-}Tb^{3+}$ appeared to be only approximately 85% of the quantum efficiency at 254 nm-excitation ($q_{254}$). For $BaMg_2Al_{16}O_{27}\text{-}Eu^{2+}$, $q_{185}$ only amounts to approximately 65% of $q_{254}$ and for $Sr_{5.5}Mg_6Al_{55}O_{94}\text{-}Eu^{2+}$, $q_{185}$ is only approximately 55% of $q_{254}$. As mentioned above, in the known lamps provided with luminescent halophosphate, of which $q_{185}$ is 95 to 100% of $q_{254}$ an initial luminous flux gain of only approximately 5% is attained if a change to a diameter of 20-25 mm is made. An explanation for the unexpectedly high gain in luminous flux which is obtained with lumps according to the invention and which may, of course, result in a considerable saving in energy has not yet been found.

As to the luminescent rare earth metal oxides, which can be used in a lamp according to said second aspect of the invention, and which are excited substantially equally well by the 185 nm mercury line as by the 254 nm mercury line, the unexpected increase of the luminous flux could be explained by the fact that these rare earth metal oxides have a quantum efficiency which increases with an increasing density of the exciting ultra-violet radiation.

A further advantage of the lamps according to said second aspect of the invention is that the decay of the luminous flux during the life of the lamp is of the same order of magnitude as that of comparable lamps having a diameter of 36 nm or is even lower.

These lamps furthermore furnish a great economic advantage because during fabrication they require a considerably smaller quantity of raw materials, such as material for the discharge tube and of luminescent material.

Preference is given to those lamps whose discharge tube has an inside diameter of between 23.5 and 25.5 mm. Very good results are then obtained as regards luminous flux gain and saving in material.

In one embodiment of the invention, the luminescent aluminate has the crystal structure of $\beta$-alumina, and a composition defined by the formula $(1-p)A.(x-q)B.yC;pEuO.qMnO$, wherein A represents BaO and/or SrO, B represents at least one of the oxides MgO, ZnO and BeO and C represents the oxide $Al_2O_3$, wherein up to 25 mole % of C may have been replaced by $Ga_2O_3$ and/or $Sc_2O_3$ and wherein $0 \leq x \leq 2$
$5 \leq y \leq 8$
$0.01 \leq p \leq 0.50$
$0 \leq q \leq 1.0$ A being BaO if $x-q=b\ 0$. With these aluminates which are described in detail in United Kingdom Specifications 1,190,520, 1,384,683 and 1,452,083, a very efficient blue emission (activation by $Eu^{2+}$) and blue-green or green emission (activation by $Eu^{2+}$ and $Mn^{2+}$) can be obtained. This applies in particular if A is BaO and B is MgO and if $x=1$, $y=5$, $0.05 \leq p \leq 0.20$ and $0 \leq q \leq 0.50$.

In another embodiment of the invention, a luminescent aluminate is used having a crystal structure which is closely related to magneto-plumbite and a composition defined by formula $(Ce_{1-p-q}La_pTb_q)_2O_3.xMgO.yAl_2O_3$ wherein up to 25 mole % of the $Al_2O_3$ may have been replaced by $Ga_2O_3$ and/or $Sc_2O_3$ and wherein $0 \leq x \leq 2$
$10 \leq y \leq 16$
$0 \leq p \leq 0.50$
$0 \leq q \leq 0.60$
$(p+q) \leq 0.90$.

With these aluminates which are described in detail in United Kingdom Specifications 1,452,083 and 1,393,040 and United Kingdom Application 49208/76 a very efficient emission is obtained in the longwave ultraviolet portion of the spectrum (activation by $Ce^{3+}$) or in the green portion of the spectrum (activation by $Ce^{3+}$ and $Tb^{3+}$). A very intense green emission is obtained with such materials, for which $x=2$, $y=11$, $p=0$ and $0.20 \leq q \leq 0.40$.

A very advantageous construction of a lamp according to the invention comprises besides a hexagonal aluminate activated by Eu or by Eu and Mn and a hexagonal aluminate activated by Ce and Tb, a red luminescing, trivalent europium-activated rare earth oxide having a composition defined by the formula $Ln_2O_3.pEu^{3+}$, wherein Ln represents at least one of the elements Y, Gd and Lu and wherein $0.01 \leq p \leq 0.20$. These lamps emit in comparatively narrow wavelength ranges in the blue, the green and the red portion of the spectrum and furnish, besides a high luminous flux, also a very good rendition of object colours (as described in United Kingdom Specification 1,458,700).

The lamps according to said second aspect of the invention can be made with the same longitudinal dimensions as the known standard types for the same power, the electrical properties being substantially equal to those of the standard types. Consequently, these lamps can replace known lamps in existing light fittings without needing to modify the light fittings. Preference is given to lamps wherein the discharge tube has a length of 60-120 cm and which, during operation, consume a power of 0.3–0.4 Watt per cm. The frequently used 20 W and 40 W lamps belong to this group.

The invention will now be further explained with reference to a drawing, a number of embodiments and measurements.

Figure 1:
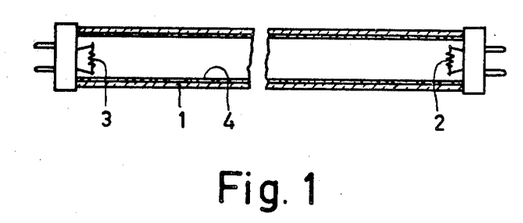
FIG. 1 shows schematically in partial cross-section a low-pressure mercury vapour discharge lamp according to said first aspect of the invention.

In FIG. 1 reference 1 is the glass discharge tube of a lamp according to the invention. This lamp has an inside diameter of 10.3 mm and a length of 30 cm. Electrodes 2 and 3 are disposed at the ends of the lamp between which the discharge takes place during operation of the lamp. The spacing between the electrodes 2 and 3 is 26 cm. The lamp is provided with argon up to a pressure of 3 torr (at room temperature) which serves as starting gas and, in addition, with a small quantity of mercury. On the interior surface the tube 1 is provided with a luminescent layer 4 which contains a luminescent material which, in accordance with the invention, has a low short term decrease and a high mercury resistance. This luminescent material can be applied to the tube 1 in a customary manner, for example by means of a suspension.

Figure 2:
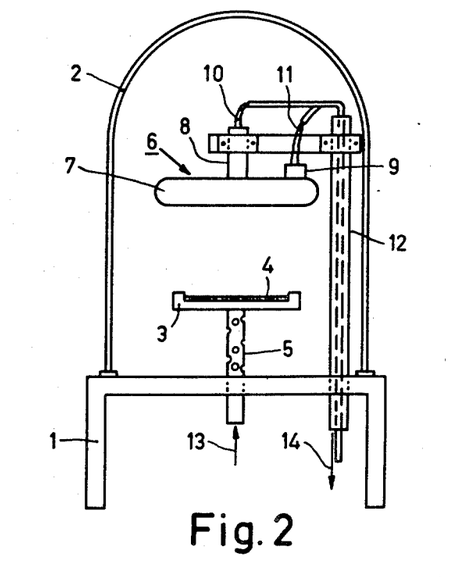
FIG. 2 shows schematically an apparatus suitable for determining the short term decrease of luminescent materials.

The arrangement shown in FIG. 2 for measuring the short term decrease of luminescent materials consists of a table 1, on which a bell jar 2 is disposed in a vacuum-tight manner. A disc-shaped holder 3 having an inside diameter of 45 mm is disposed inside the bell jar 2. A layer 4 of the luminescent powder to be tested is applied in the container 3. The container 3 is supported by a hollow tube 5 which is provided with holes in the portion situated within the bell jar 2. Furthermore an UV radiation source 6 is arranged inside the bell jar 2. This radiation source 6 is a low-pressure mercury vapour discharge lamp consisting of a quartz glass tube 7 having an inside diameter of approximately 9.5 mm. The tube 7 is formed into a horizontal, flat spiral having approximately 2.5 turns, so that a flat disc-shaped radiation source having a diameter of approximately 70 mm is obtained, The ends 8 and 9 of the tube 7 are perpendicular to the plane of the spiral part of the radiation source and comprise an electrode each. The spacing between the electrodes measured along the discharge path is approximately 33 cm. In addition, the tube 7 is provided with a rare gas and a quantity of mercury. Electric conductors 10 and 11 ensure the supply of the required electric power to the electrodes of the source 6 and are led out from the bell jar 2 through a hollow tube 12. During operation of the source 6 the column voltage is approximately 65 V and the lamp current approximately 500 mA. The spacing from the source 6 to the luminescent layer is 45 mm. The greater part of the UV radiation generated in the source is passed by the quartz tube 7. Nitrogen is passed into the bell jar at 13 during the measurements. The nitrogen current is discharged again at 14. The nitrogen atmosphere thus formed substantially absorbs no short wave UV radiation. It appears that during the irradiation the UV-radiation density (185 nm and 254 nm radiation) at the luminescent layer 4 is approximately 330 W/m$^2$. The ratio between 185 nm power and 254 nm power has a value of approximately 0.30. The value of this ratio is important because of the fact that in low-pressure mercury vapour discharge lamps the luminescent material is not only charged with 185 nm radiation but of course also with 254 nm radiation. It has namely appeared that the effect of 185 nm radiation on a luminescent material depends on the simultaneous presence of 254 nm radiation. Reproduceable measurements are obtained with a value of said ratio between 0.20 and 0.40. For the determination of the short term decrease of a luminescent material a sample of the material is irradiated for 15 minutes in an arrangement as shown in FIG. 2. It appeared that irradiation for 15 minutes with radiation densities between 150 and 500 W/m$^2$ furnishes reproduceable results. After 15 minutes irradiation the luminous flux of the sample is determined in the customary manner, measures being taken to prevent in the mean time UV or visible radiation reaching the sample. The luminous flux measured in this way is then compared with the luminous flux determined in an identical manner of a non-irradiated sample.

In the manner described above the short term decrease of a great number of luminescent materials was determined. Table I lists the results of these measurements for Examples 1–10 of luminescent materials which are suitable for use in lamps according to the invention. Besides the formula of the material the table shows for each example, in the column "e.n." the value of the electronegativity of the combination of cations in the material. The column "S.T.D." shows the short-term decrease in %. The examples a and b have been included for comparison. These examples relate to materials which are frequently used in normal lamps, but which are not suitable for use in lamps according to the invention because their S.T.D. is too high. Example c (willemite) is also included for the purpose of comparison. This material, which is also frequently used in normal lamps has an excellent S.T.D. but is not suitable for use in lamps according to the invention because the mercury resistance of the material is too low. This is evidenced by the value of the e.n., which exceeds 1.4. In highly loaded lamps this material is already strongly attacked after a short period of time (actually already after stabilizing of the lamp on the test bench when measuring the so-called 0-hour value) as that too low a value is obtained for the luminous flux.

The materials from Table I were applied in lamps having an inside diameter of 10.3 mm as described with reference to FIG. 1. These lamps were operated with a lamp current of 175 mA and an electric field strength of 196 V/m (wall load 750 W/m$^2$. Measurements of the column efficiency at 0 hour (after stabilizing of the lamp, that is to say the efficiency of the conversion of the power input in the discharge column into useful radiation, are specified in Table I under "LO 0 hour, $\phi$10.3". For comparison the values of the column efficiency of these materials when used in normal lamps having an inside diameter of 36 mm (wall load 300 W/m$^2$) are given under "LO 0 hour, $\phi$36". It is clear that reducing the diameter, which results in highly loaded lamps, in accordance with the invention, is not accompanied by a loss in efficiency.

TABLE I

| Example | Formula | o.n. | S.T.D. in % | LO 0 h in (lm/W) $\phi 10.3$ | $\phi 36$ |
|---|---|---|---|---|---|
| 1 | $Y_2O_3$—$Eu_{0.1}^{3+}$ | 1.2 | 1–2 | 81.5 | 83.5 |
| 2 | $Co_{0.67}Tb_{0.33}MgAl_{11}O_{19}$ | 1.2 | 3 | 140 | 140 |
| 3 | $BaMgAl_{10}O_{17}$—$Eu^{2+}$ | 1.1 | 1.5 | 31 | 28 |
| 4 | $Ba_{0.85}Mg_{1.4}Al_{16}O_{27}$—$Eu_{0.15}^{2+}$ $Mn_{0.60}^{2+}$ | 1.1 | 2.7 | — | — |
| 5 | $SrMgAl_{10}O_{17}$—$Eu^{2+}$ | 1.1 | 1–2 | 53 | 46 |
| 6 | $SrB_4O_7$—$Eu^{2+}$ | 1.0 | 2 | $0.37^1$ | $0.33^1$ |
| 7 | $BaSi_2O_5$—$Pb^{2+}$ | 0.9 | 1 | $0.27^1$ | $0.27^1$ |
| 8 | $Sr_5(PO_4)_3Cl$—$Eu^{2+}$ | 1.0 | 0–1.5 | 21 | 20 |
| 9 | $GdB_3O_6$—$Ce^{3+}, Tb^{3+}$ | 1.1 | 1 | 124 | 122 |
| 10 | $GdBO_3$—$Bi^{3+}Eu^{3+}$ | 1.1 | 3.5 | 57 | 54 |
| a | $Ca_5(PO_4)_3(F,Cl)$—$Sb,Mn(3000K)$ | 3.0 | 7.2 | 85 | 93 |
| b | $Ca_5(PO_4)_3(F,Cl)$—$Sb,Mn(4000K)$ | 1.0 | 6 | 85 | 93 |
| c | $Zn_2SiO_4$—$Mn^{2+}$ | 1.6 | 1 | 88 | 107 |

[1] The materials stated in example 6 and 7 emit in the ultra-violet part of the spectrum. The column efficiency is here given as the radiation output in Watt per Watt of column input (W/W).

EXAMPLES 11, 12 AND 13

Three lamps were made of the type described with reference to FIG. 1, however, having different inside diameters namely 7.8, 10.3 and 14.5 mm. The lamp having an inside diameter of 7.8 mm was operated with a lamp current of 100 mA and a field strength of 286 V/m, consequently the wall load was approximately 780 W/m². For the lamp having an inside diameter of 10.3 mm these values were 175 mA, 196 V/m and 750 W/m² respectively, and for the lamp having an inside diameter of 14.5 mm: 250 mA, 150 V/m and 595 W/m². The three lamps were provided with a blue luminescent material in accordance with the formula $BaMgAl_{10}O_{17}$-$Eu^{2+}$. Table II shows the results of measurements of the column efficiency during the life of these lamps, that is to say the luminous flux in lumens per Watt of the electric power input in the column at various instants during burning of the lamp. The table lists the luminous efficacy after 100 hours, LO 100 hours, in lm/W. The measuring results at 0 h and 500 h are stated in % relative to the values at 100 h.

TABLE II

| lamp no. | $\phi$ (mm) | LO 100 h (lm/W) | LO 0 h (%) | LO 500 h (%) |
|---|---|---|---|---|
| 11 | 7.8 | 26.3 | 104 | 95 |
| 12 | 10.3 | 25.6 | 101 | 93 |
| 13 | 14.5 | 27.7 | 100 | 92 |

EXAMPLES 14, 15 AND 16

The same procedure was used as described above for the examples 11, 12 and 13. Now, however, the three lamps were provided with a red luminescent material in accordance with the formula $Y_2O_3$-$Eu^{3+}$. Table III specifies measurements of the column efficiency at 0, 100, 500 and 1000 hours.

TABLE III

| lamp no. | $\phi$ (mm) | LO 100 h (lm/W) | LO 0 h (%) | LO 500 h (%) | LO 1000 h (%) |
|---|---|---|---|---|---|
| 14 | 7.8 | 78.3 | 100 | 99 | 97 |
| 15 | 10.3 | 81.8 | 103 | 101 | 94 |
| 16 | 14.5 | 79.4 | 98 | 97 | 97 |

EXAMPLE 17

A lamp as shown in FIG. 1, however, having an inside diameter of 7.8 mm, was provided with a green luminescent aluminate in accordance with the formula $Ce_{0.67}Tb_{0.33}MgAl_{11}O_{19}$. The lamp, which was operated with 100 mA, 286 V/m (load 790 W/m²) had at 100 hours a column efficiency of 122.5 lm/W. At 0, 500 and 1000 hours the luminous efficacy was 103, 96 and 96% respectively of the luminous flux at 100 hours.

EXAMPLES 18, 19 AND 20

Three lamps as shown in FIG. 1, however, having a length of 45 cm and an inside diameter of 7.8 mm, were provided with a mixture of three luminescent materials, namely $Y_2O_3$-$Eu^{3+}$, $Ce_{0.67}Tb_{0.33}MgAl_{11}O_{19}$ and $BaMgAl_{10}O_{17}$-$Eu^{2+}$ in such quantities that the radiation emitted by the lamp has a colour temperature of 3000 K. The lamps were operated with a current of 200 mA. The results of measurements of the column efficiency are summarized in table IV. In addition, table IV specifies the measurements for three lamps (e, f, g), which were provided with a luminescent calcium halophosphate activated by antimony and manganese and having a colour temperature of 3000 K. These lamps which were in all other respects identical to the lamps 18, 19 and 20, are not in accordance with the invention and have only been included for reasons of comparison. It is clear that with lamps according to the invention a high luminous efficacy can be obtained and that this luminous efficacy is maintained very well during the life of the lamp.

TABLE IV

| lamp no. | LO 100 h (lm/W) | LO 0 h (%) | LO 500 h (%) | LO 1000 h (%) |
|---|---|---|---|---|
| 18 | 93.4 | 102 | 99 | 93 |
| 19 | 92.0 | 101 | 97 | 93 |
| 20 | 92.1 | 103 | 96 | 96 |
| e | 70.1 | 111 | 91 | 78 |
| f | 66.4 | 110 | 89 | 79 |
| g | 67.6 | 110 | 90 | 76 |

EXAMPLES 21 TO 26 INCLUSIVE

Three lamps (no. 21, 22 and 23), fully identical to the lamps 18, 19 and 20 were operated with 100 mA. Three identical lamps (no. 24, 25 and 26) were operated with 300 mA. The results of measurements of the column efficiency are shown in table V.

TABLE V

| lamp no. | LO 100 h (lm/W) | LO 0 h (%) | LO 500 h (%) | LO 1000 h (%) |
| --- | --- | --- | --- | --- |
| 21 | 99.0 | 102 | 101 | 100 |
| 22 | 105.4 | 100 | 99 | 96 |
| 23 | 106.7 | 101 | 100 | 97 |
| 24 | 77.5 | 99 | 95 | 84 |
| 25 | 81.4 | 105 | 99 | 94 |
| 26 | 78.0 | 103 | 95 | 87 |

It is clear that the above-mentioned embodiments only serve to illustrate the invention. On the basis of the requirements formulated in this description as regards short term decrease and mercury resistance and by means of the methods described here for determining these properties, one skilled in the art can easily ascertain which luminescent materials are suitable for use in lamps according to the invention. Furthermore it should be noted that a luminescent material which, for example, does not satisfy the requirements imposed on the short-term decrease can be made suitable, for example by optimizing the preparation of this material. It is, furthermore, conceivable that a luminescent material becomes sufficiently mercury resistant by coating the material with a protective layer.

Figure 3:
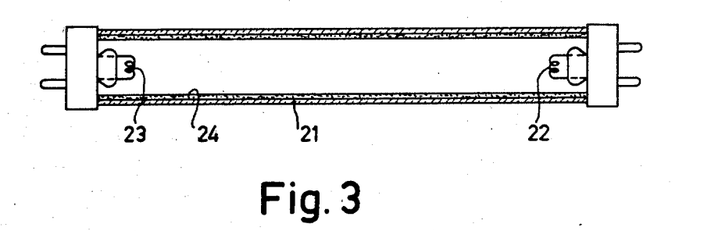
FIG. 3 shows schematically in partial cross-section a low-pressure mercury vapour discharge lamp according to said second aspect of the invention.

In FIG. 3 of the drawing a lamp according to said second aspect of the invention is shown. Reference 21 indicates the glass discharge tube of a low-pressure mercury vapour discharge lamp, which lamp consumes in operation a power of 40 Watts. The discharge tube 21 is 120 cm long, has an inside diameter of 24 mm and a wall thickness of 0.7 mm. It will be understood hereafter that examples identified as being of the type shown in FIG. 3 have in one preferred embodiment these dimensions. Electrodes 22 and 23 between which the discharge takes place when the lamp is in operation are disposed one at each end of the tube 21. The discharge tube 21 contains a rare gas or a mixture of rare gases at a pressure of 0.5 to 5 torr. The rare gas serves as a starting gas. In addition, the discharge tube comprises a small quantity of mercury. The inner side of the discharge tube 21 bears a luminescent layer 24 which comprises a luminescent aluminate having a hexagonal crystal structure and/or a luminescent rare earth metal oxide. This luminescent layer 24 can be applied in a customary manner to the tube 21, for example, by means of a suspension, containing the luminescent substance. In a manner which is known in itself, a reflector coating for visible radiation can be applied in a lamp according to the invention between the tube 21 and the luminescent layer 24 which reflector coating extends across a portion of the tube 21. Furthermore it is possible, starting from a straight discharge tube as shown in the drawing, to construct the lamp as a curved tube, for example as a torus or in an U-shape.

EXAMPLE 27

A 40 W lamp of the type shown in FIG. 3 of the drawing was provided with a luminescent layer consisting of a mixture of 38 wt.% $Ce_{0.67}Tb_{0.33}MgAl_{11}O_{19}$
12 wt.% $Ba_{0.9}Eu_{0.1}MgAl_{10}O_{17}$
50 wt.% $Y_{1.9}Eu_{0.1}O_3$.

Besides mercury, the lamp contained 2.2 torrs of argon so that the lamp, when connected to a standard 40 W ballast appeared to consume a power of approximately 40 W at a lamp current of 390 mA. The white light omitted by the lamp had a colour temperature of approximately 4000 K and had a particularly good colour rendition. The initial luminous flux of this lamp was 96.4 lm/W. After 100 hours the luminous flux had decreased by only 1.5% to 95.0 lm/W. With a similar lamp after 1000 hours a luminous flux was obtained which was 99% of the luminous flux at 100 hours. For comparison, a 40 W lamp having a discharge tube with an inside diameter of 36 mm was made with the same luminescent mixture. This lamp required a quantity of luminescent material which was 50% larger. The rare gas in this lamp was a mixture of 75% A and 25% Ne at a pressure of 2.5 torr. This lamp (power consumed 40 W, lamp current 425 mA) had an initial luminous flux of 89.5 lm/W which had dropped 2.8 % to 87.0 lm/W after 100 hours. It is apparent that the lamp according to the invention (at 100 hours) yields a luminous flux which is 9.2% greater than of the known lamp. By comparison a 40 W halophosphate lamp (4000 K) with a 24 mm diameter had, after 100 hours, a luminous flux which was only approximately 5% higher relative to a comparable lamp having a 36 mm discharge tube. In addition the halophosphate lamp has at 1000 hours a luminous flux which is only 93% of the luminous flux at 100 hours.

EXAMPLE 28

A lamp provided with a discharge tube having a length of 150 cm and an inside diameter of 24 mm was coated with the same mixture of luminescent materials as was used in Example 1. A mixture of 25% A and 75% Kr at a pressure of 1.5 torr was used as rare gas. When the lamp was connected to a 65 W ballast, the lamp appeared to consume a power of approximately 59 W at a lamp current of 678 mA. The initial luminous flux of the lamp was 96.1 lm/W. After 100 hours this luminous flux is 94.1 lm/W (decrease 2.1%). A comparable lamp, however, with a discharge tube having an inside diameter of 36 mm and filled with 2.4 torr A, appeared to consume a power of 64 W at a lamp current of 670 mA and had an initial luminous flux of 88.2 lm/W. After 100 hours the luminous flux had decreased approximately 4.1% to 84.7 lm/W. At 100 hours the lamp according to the invention had a luminous flux which was 11.1% greater than that of the said comparable lamp.

EXAMPLE 29

A 40 W lamp of the type shown in FIG. 3 or the drawing was provided with a luminescent layer consisting of 3.15 grams of $Ce_{0.67}Tb_{0.33}MgAl_{11}O_{19}$. The green light emitted by the lamp had an initial luminous flux of 121.3 lm/W. After 100 hours the luminous flux had decreased by only 1.6% to 119.4 lm/W. For comparison a 40 W lamp having a discharge tube with an inside diameter of 36 mm was made with 4.5 grams of the same luminescent substance. This lamp had an initial luminous flux of 113.5 lm/W. After 100 hours the luminous flux had decreased 3.1% to 110.1 lm/W.

EXAMPLE 30

A 40 W lamp of the type shown in FIG. 3 of the drawing was provided with a luminescent layer consisting of a blue luminescent $Ba_{0.9}Eu_{0.1}MgAl_{10}O_{17}$. The relative luminous flux was initially 35.1 (in arbitrary units) and after 100 hours 32.7. For comparison, a 40 W lamp having an inside diameter of 36 mm was made using the same luminescent substance. This lamp had initially a relative luminous flux of 33.0 and after 100 hours of 31.4.

EXAMPLE 31

A 40 W lamp of the type shown in FIG. 3 of the drawing was provided with a luminescent layer consisting of 5.3 grams of mixture of 54.8 wt.% $Y_{1.9}Eu_{0.1}O_3$
36.6 wt.% $Ce_{0.67}Tb_{0.33}MgAl_{11}O_{19}$
8.6 wt.% $Ba_{0.9}Eu_{0.1}MgAl_{10}O_{17}$.

The white light emitted by the lamp had an initial luminous flux of 100.4 lm/W. After 100 hours the luminous flux had decreased by only 0.3% to 100.1 lm/W. After 1000 hours the luminous flux was 98.4 lm/W. For comparison, a 40 W lamp having a discharge tube with an inside diameter of 36 mm was made with 7.65 grams of the same luminescent mixture. This lamp had an initial luminous flux of 92.6 lm/W. After 100 hours the luminous flux had decreased to 92 lm/W and after 1000 hours to 89.9 lm/W.

EXAMPLE 32

A 40 W lamp of the type shown in FIG. 3 of the drawing was provided with a luminescent layer consisting of 3.05 grams of a red luminescent $Y_{1.9}Eu_{0.1}O_3$. The luminous flux of this lamp was initially 76.2 lm/W and after 100 hours 72.5 lm/W. For comparison, a 40 W lamp having an inside diameter of 36 mm was made with 4.65 grams of the same luminescent substance. This lamp had initially a luminous flux of 70.2 lm/W and after 100 hours of 68.1 lm/W.

EXAMPLE 33

A 40 W lamp of the type shown in FIG. 3 of the drawing was provided with a luminescent layer consisting of 7.5 grams of a red luminescent $Y_{1.9}Eu_{0.1}O_3$. The luminous flux of this lamp was initially 78.4 lm/W and after 100 hours 77.0 lm/W. For comparison, a 40 W lamp having an inside diameter of 36 mm was made with 10.4 grams of the same luminescent substance. This lamp had initially a luminous flux of 71.5 lm/W and after 100 hours of 70.9 lm/W.

What is claimed is:

1. A low-pressure mercury vapour discharge lamp having a vacuum-tight, radiation-transmissive envelope, provided with a luminescent layer and a gas filling comprising mercury and a rare gas wherein mercury radiation at 254 nm is generated, and furthermore provided with means for maintaining a column discharge in the gas filling, the power consumed by the column being at least 500 W per m² surface area of the luminescent layer, characterized in that the luminesent layer contains a luminescent material which has the property of having a 254 nm-excitation a luminous flux which, after the material has been subjected for 15 minutes to ultraviolet radiation of a wavelength of mainly 185 and 254 nm and a radiation density between 150 and 500 W/m² and a ratio of 185 nm power to 254 nm power between 0.20 and 0.40, is not more than 5% lower than the initial luminous flux of the material also at 254 nm excitation and measured under identical circumstances, and in that the combination of cations in the luminescent material has an electronegativity of not more than 1.4.

2. A low-pressure mercury vapour discharge lamp as claimed in claim 1, wherein an electric field strength of 150 to 1000 V/m is maintained in the column discharge during operation of the lamp.

3. A low-pressure mercury vapour discharge lamp as claimed in claim 2, wherein the envelope has a tubular shape, whose cross-section perpendicular to the axis of the tube is substantially circular and whose inside diameter is from 3 to 15 mm.

4. A low-pressure mercury vapour discharge lamp as claimed in claim 1, characterized in that the luminescent material is a red luminescing, trivalent europium-activated rare earth oxide in accordance with the formula $Ln_2O_3:pEu^{3+}$, wherein Ln represents at least one of the elements Y, Gd and Lu and wherein $0.01 \leq p \leq 0.20$.

5. A low-pressure mercury vapour discharge lamp as claimed in claim 1, characterized in that the luminescent material is an aluminate activated by cerium and terbium and having a hexagonal crystal structure related to the structure of magnetoplumbite, which aluminate satisfies the formula $(Ce_{1-p-q}La_pTb_q)_2O_3 \cdot xMgO \cdot yAl_2O_3$, wherein up to 25 mol.% of the $Al_2O_3$ may have been replaced by $Ga_2O_3$ and/or $Sc_2O_3$ and wherein $0 \leq x \leq 2$
$10 \leq y \leq 16$
$0 \leq p \leq 0.50$
$0 \leq q \leq 0.60$
$p+q \leq 0.90$ 6. A low-pressure mercury vapour discharge lamp as claimed in claim 1, characterized in that the luminescent material is an aluminate, activated by bivalent europium, by bivalent europium and bivalent manganese or by trivalent cerium and having a hexagonal crystal structure related to the structure of β-alumina, which aluminate satisfies the formula $MeO \cdot xMgO \cdot yAl_2O_3 : pEuO \cdot qMnO \cdot rCe_2O_3$, wherein Me represents Ba and/or Sr, wherein up to 25 mol.% of the $Al_2O_3$ may have been replaced by $Ga_2O_3$ and/or $Sc_2O_3$ and wherein $0 \leq x \leq 2$
$5 \leq y \leq 8$
$0.01 \leq p \leq 0.50$
$0 \leq q \leq 1.0$
$0 \leq r \leq 0.50$, wherein Me is Ba if $x=0$.

7. A low-pressure mercury vapour discharge lamp as claimed in claim 1, characterized in that the luminescent layer comprises at least a luminescent material of the group consisting of bivalent europium-activated strontium tetraborate, lead-activated barium disilicate, bivalent europium-activated strontium chlorophosphate with apatite structure, gadolinium metaborate activated by cerium and terbium, and gadolinium borate activated by trivalent bismuth and trivalent europium.

* * * * *

UNITED STATES PATENT AND TRADEMARK OFFICE
CERTIFICATE OF CORRECTION

PATENT NO. : 4,335,330

DATED : June 15, 1982

INVENTOR(S) : ROBERT C. PETERS ET AL

It is certified that error appears in the above—identified patent and that said Letters Patent is hereby corrected as shown below:

In the Title Page: The last name of the third inventor should read –

--Couwenberg--

Col. 2, lines 10 and 11, delete "Wall loads of the order of 25,000 $W/m^2$ may occur in these lamps."

Col. 5, line 20, delete the line in its entirety and insert as a new paragraph –

--A preferred embodiment of a lamp according to the invention contains as luminescent material a red luminescing, trivalent europium-activated rare earth oxide in accordance with the formula $Ln_2O_3; Eu_p^{3+}$, where Ln represents at least one of the elements Y, Gd and--

UNITED STATES PATENT AND TRADEMARK OFFICE
CERTIFICATE OF CORRECTION

PATENT NO. : 4,335,330

DATED : June 15, 1982

INVENTOR(S) : ROBERT C. PETERS ET AL

It is certified that error appears in the above—identified patent and that said Letters Patent is hereby corrected as shown below:

Col. 5, line 55, "corium" should read --cerium--

Col. 7, line 49, "lumps" should read --lamps--

Col. 8, line 19, the equation should read: -- $X-q=0$ --

Col. 10, line 50, "as" should read --so--

Col. 11, Table I, the heading of the third column should be --e.n.-- instead of "o.n."

For example a in Table I e.n. is 1.0 instead of --3.0--

Col. 13, line 68, "omitted" should read --emitted--

Col. 14, line 47, "or" should read --of--

Col. 15, line 52, "a" (first occurrence) should read --at--

UNITED STATES PATENT AND TRADEMARK OFFICE
CERTIFICATE OF CORRECTION

PATENT NO.   : 4,335,330

DATED        : June 15, 1982

INVENTOR(S)  : ROBERT C. PETERS ET AL

It is certified that error appears in the above-identified patent and that said Letters Patent is hereby corrected as shown below:

In claim 5, at lines 3 and 4 "cerium and terbium" should read --cerium or by terbium and cerium--.

Signed and Sealed this

Twelfth Day of June 1984

[SEAL]

Attest:

GERALD J. MOSSINGHOFF

Attesting Officer

Commissioner of Patents and Trademarks